(12) United States Patent
Aerrabotu et al.

(10) Patent No.: US 7,826,825 B2
(45) Date of Patent: Nov. 2, 2010

(54) METHOD AND APPARATUS FOR PROVIDING A DATA PROTOCOL VOICE ENABLED SUBSCRIPTION LOCK FOR A WIRELESS COMMUNICATION DEVICE

(75) Inventors: Naveen Aerrabotu, Gurnee, IL (US); Bharat Srinivasan, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 894 days.

(21) Appl. No.: 11/678,609

(22) Filed: Feb. 25, 2007

(65) Prior Publication Data
US 2008/0207166 A1 Aug. 28, 2008

(51) Int. Cl.
H04M 1/66 (2006.01)
H04M 3/16 (2006.01)
(52) U.S. Cl. .................... 455/410; 455/411; 726/1
(58) Field of Classification Search .......... 455/410, 455/411; 726/1
See application file for complete search history.

(56) References Cited

U.S. PATENT DOCUMENTS 5,444,764 A    8/1995  Galecki et al.
2005/0286711 A1  12/2005  Lee et al.
2007/0155363 A1*  7/2007  Rager et al. ................ 455/410
2007/0192826 A1*  8/2007  Frank et al. ................... 726/1
2008/0207166 A1*  8/2008  Aerrabotu et al. ........... 455/411

FOREIGN PATENT DOCUMENTS

JP   2001297063 A  * 10/2001
JP   2008250930 A  * 10/2008
WO  2006126962 A2   11/2006

\* cited by examiner

Primary Examiner—William D Cumming
(74) Attorney, Agent, or Firm—Roland K. Bowler, II; Philip H. Burrus, IV

(57) ABSTRACT

A method and system for restricting at least partial usage of a wireless communication device (100), like a mobile telephone, includes attempting to establish a communication channel (105) across a data network, such as non-IMS VoIP communication channel over a wide area network (103) like the Internet. Where the device (100) has been subsidized by a voice over data protocol service provider (121), the method permits such communication only when data communication channels having service provider identifiers (123) corresponding to one or more permitted data access identification codes (201) are accessible. Where they are not, at least partial usage of the device (100) will be restricted.

18 Claims, 3 Drawing Sheets

METHOD AND APPARATUS FOR PROVIDING A DATA PROTOCOL VOICE ENABLED SUBSCRIPTION LOCK FOR A WIRELESS COMMUNICATION DEVICE

BACKGROUND

1. Technical Field

This invention relates generally to wireless communication devices that are configured to communicate across non-IMS packet based wide area data networks, and more particularly to a system and method for limiting data based voice enabled communication to a predetermined group of service providers for at least a predetermined time.

2. Background Art

Communication technology is constantly evolving. For instance, there was a time where the only way to make a telephone call was across a copper wire with the assistance of a human operator. Today, by contrast, people are able to call others around the world with a variety of communication devices, including cellular telephones, satellite telephones, and network-based communication systems such as voice over Internet protocol phone devices that function with the assistance of a computer or other specialized hardware. In addition to these voice-based channels, people may communicate via electronic mail, text messaging, video conferences, and multimedia messaging as well.

With the advent of new communication protocols and technologies, device manufacturers are continually designing more features into their handsets. Similarly, service providers are continually upgrading their networks to accommodate these new features. By way of example, most mobile telephones offered by service providers today include both text and multimedia messaging in addition to voice capabilities.

Service providers often find it helpful in attracting new customers, or in enticing existing customers to upgrade existing service or hardware, to subsidize the customer's purchase of new hardware. In subsidization, the service provider pays a portion of the customer's hardware purchase price. Such a practice is helpful to consumers because multi-feature handsets tend to be sophisticated devices, and the subsidization lowers the overall price to the consumer. This subsidization is generally in return for the customer agreeing to patronize the service provider for a predetermined time, such as one or two years.

For subsidization to be economically viable for the service provider, the service provider needs assurance that the customer will continue to patronize the service provider for at least the predetermined time. Some methods, sometimes called "subsidy locks", are known in the art. For instance, in conventional cellular telephone systems, such as Global Systems for Telecommunications (GSM) systems, one known method of ensuring that the customer uses only the service provider's network is to employ a lock for restricting registration onto a mobile phone network to only those mobile phones that contain a subscriber interface module (SIM) card that has a international mobile subscriber identification (IMSI) which corresponds to an IMSI recognized by the service provider. One example of such a conventional GSM subsidization process may be found in the specification GSM 02.22 Personalization of GSM Mobile equipment, V7.0.0 1999 (Release 1998).

While such a system works well for conventional mobile communications, new communication methods, such as Voice over Internet Protocol (VoIP) and other applications including e-mail over voice over data network communications, may or may not require SIM cards for communication. Further, conventional subsidization methods are ineffective for some new technologies because the required profiles and attributes are not stored in a SIM card. There is thus a need for an improved method and system—for services such as VoIP—for providers of new communication methods to ensure that customers use subsidized hardware with the service provider's network systems for at least the predetermined usage period.

Figure 1:
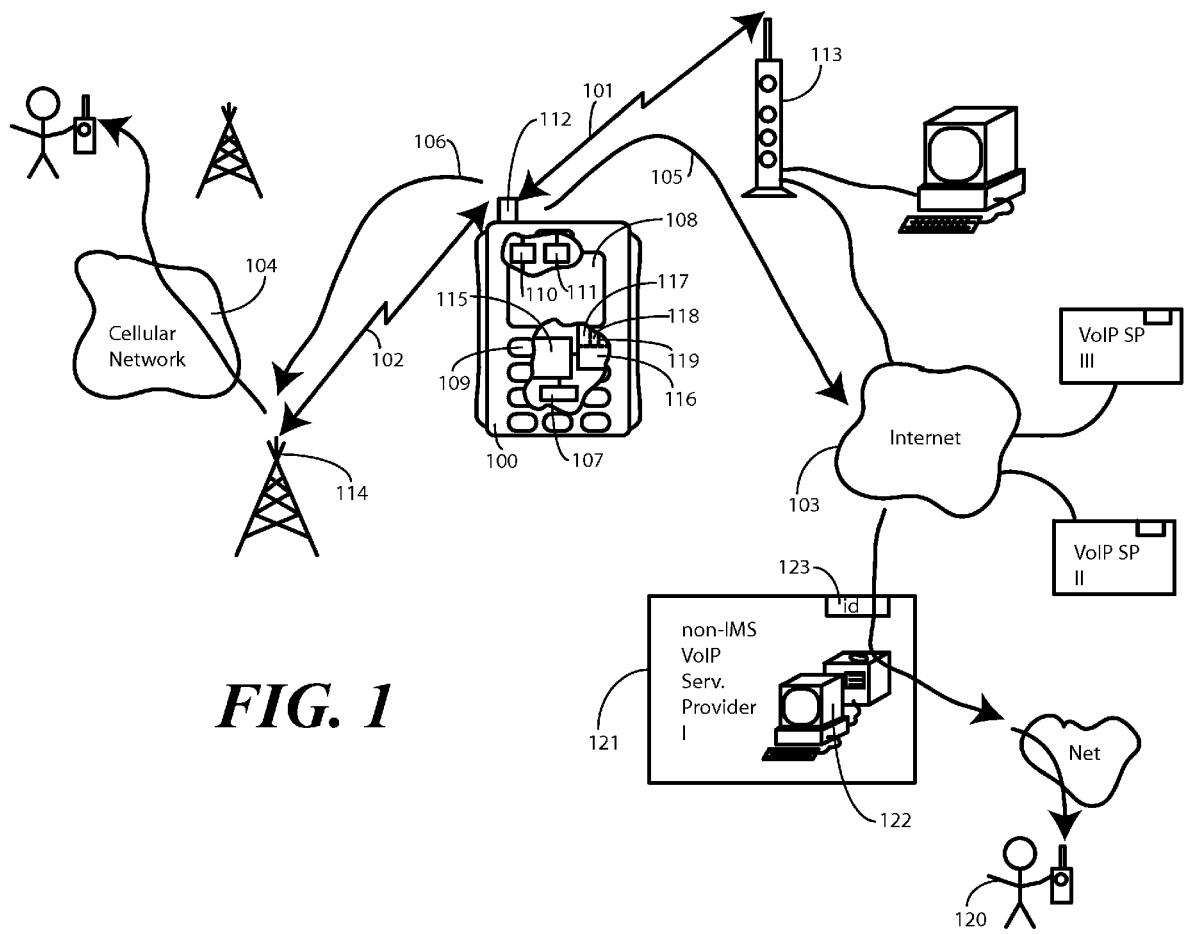
FIG. 1 illustrates a mobile communication device in accordance with one embodiment of the invention configured to communicate with either a conventional mobile network or a non-IP Multimedia Subsystem (IMS) network that includes a non-IMS subsidy lock.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a method and system for restricting at least partial usage of a wireless communication device that is configured to communicate across alternate networks. Components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of restricting at least partial usage of a wireless communication device as described herein. The non-processor circuits may include, but are not limited to, a radio receiver, a radio transmitter, signal drivers, clock circuits, power source circuits, and user input devices. As such, these functions may be interpreted as steps of a method to restrict partial usage of the wireless communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two (or more) approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

A system and method for providing a non-IP Multimedia Subsystem (non-IMS) subsidy lock in a mobile communication device is provided. The system and method are suitable for use in communication devices configured to communicate across multiple network configurations. For instance, in a mobile handset that is configured to accommodate packet switched voice calls across both a traditional network, such as a GSM or code duplexed multiple access (CDMA) cellular network, and a non-traditional network or Internet, such as a data protocol voice enabled system like non-IMS VoIP, the method and system ensures that any non-traditional communications from subsidized hardware will be handled by the subsidizer's network and infrastructure for at least a predetermined time. The method and system are particularly well suited to applications where communication is accomplished by routing the data packets through the Internet rather than the subsidizer's network, as users may try to bypass the subsidizer during call setup. The subsidizer needs a way to prevent a subsidized user from signaling and data routing through non-subsidized channels where voice packets are transmitted.

Some devices today accommodate various communication modes. For example, a user with a GSM handset may make packet switched calls across the GSM network. Additionally, new "3G" phones will accommodate calls not only on traditional networks, but also across an IP Multimedia Subsystem (IMS) network as well. With IMS communication, service providers are able to provide multimedia services in addition to voice services. IMS uses a VoIP standardized communication system employing session initiated protocol (SIP) messaging to deliver data. (Service for IMS is typically supported by the traditional cellular service providers.) With either traditional cellular or IMS communication, conventional subsidy locks that rely upon SIM cards, electronic serial numbers (ESNs), or IMSI are effective, as registration with the channel (i.e. the cellular network) through which these communications are made is controlled by the service provider. A device attempting to communicate across an IMS or other conventional channel will simply be blocked from accessing the network when the device is "locked out" of the network.

The present invention contemplates the use of communication channels other than those offered by a single network provider. For instance, the present invention contemplates a handset that offers communication through both a cellular provider and a non-IMS service provider, such as a non-IMS VoIP service provider through the Internet. Such a device detects the presence of local area data connections, such as a router connected to a wide area network like the Internet, and switches calls and services from one network—e.g. the cellular service provider operating on its own network—to another network—e.g. a VoIP operator operating across the Internet. (As an alternative to automatic detection, users may manually register and use services of the other network by manually accessing the other network through a public router connected thereto.) Where the non-IMS VoIP network operator contributes to the subsidization of hardware, the present invention provides a method and apparatus that only the non-IMS VoIP operator's service is used for the non-IMS VoIP calls.

In one embodiment of the invention, the mobile device includes hardware that accommodates non-IMS data network voice enable communication, in addition to other forms of wireless communication. Traditionally, such non-IMS communication required the use of a computer or a specially configured gateway to provide VoIP calling capability. The mobile device of the present invention includes a user agent configured to provide non-IMS VoIP service to an authorized subscriber by a particular service provider. The non-IMS user agent, in one embodiment, includes a SIP profile stored within a memory of the handset that enables usage of VoIP communication from non-IMS service providers. Such a handset allows a user to communicate through a traditional, base station type cellular network while in the car, yet through a wireless router connected to the Internet at home.

It is well to note that there are applications in communication devices that use their own user agents. Some applications have been developed that employ a user agent and an embedded SIP stack. By way of example, applications written in Java, Brew, or Symbian may include their own user agent modules. Some of these applications even have the ability to access non-subsidizing service providers for e-mail and voice communications. Where an application having its own user agent is operable on the device, embodiments of the present invention provide a mechanism where the device, prior to accessing the router or network, always takes priority and overrides the application specific user agent. Thus, the subsidy lock user agent of the present invention is employed regardless of a particular device's application configuration. The invention overrides other application specific user agents, in one embodiment, at the transport layer or TCP/IP layer. The overriding subsidy lock user agent profile is digitally signed and validated. The software is so configured that this subsidy lock user agent is loaded and executed from memory at a special address, thereby providing the required override capability. In one embodiment, such a user agent may be enabled by a service provider only for the period of a subsidized contract. It could be otherwise disabled.

In accordance with one embodiment of the invention, a device manufacturer or service provider preconfigures the user agent profile associated with non-IMS VoIP communication prior to delivery to the customer. Alternatively, the user agent profile may be delivered to the device wirelessly, for instance through a SIP message or other form of packetized data delivery. In one embodiment, the user agent profile is stored in a restricted area of memory that is not accessible by the user, which ensures that the user agent profile will not be tampered with for at least the predetermined period. The restricted area of memory may be opened and may become accessible to the user once this predetermined period has expired.

One example of the structure and contents of such a user agent profile is set forth in the Internet Engineering Task Force (IETF) drafts 1, 2, and 3. These drafts also provide for the administration and delivery of the user agent profiles to mobile devices. The user agent profiles, in one embodiment, include a data set that is unique to a particular user or device. User agent profiles are known in the art. Such agents are discussed in the following articles and publications, which are incorporated herein by reference: 1) Petrie, D., "A Framework for Session Initiation Protocol User Agent Profile Delivery", IETF Draft, February 2005; 2) Petrie, D., "A Schema for Session Initiation Protocol User Agent Profile Data Sets", IETF Draft, July 2004; 3) Petrie, D., "The Core Session Initiation Protocol User Agent Profile Data Set", IETF Draft, July 2005; 4) GSM 02.22, Personalization of the GSM Mobile equipment, V7.0.0, 1999(Release 1998); and 5) 3GPP 23.228, IP Multimedia Sybsystem, V6.7.0 (Release 6).

A sample user agent profile, as may be employed with the present invention, is shown below:

```
<?xml version="1.0" encoding="UTF-8" ?>
<sipuserprofile name="profile1" version="1.0" template="1.0">
  <!-- Address of Record organizes the data per public user identity
-->
  <networkname></networkname> <!-- contains the network name for
SIP -->
    <aor type="SIPAttribute">sip:username</aor>
    <expires type="SIPAttribute">3600</expires>
    <!-- TCP or UDP will be used in Contact and for local communication
also -->
    <srctransport>UDP</srctransport>
    <registrar>net2phone.com</registrar>
    <!-- SIPHeader corresponds to a header that appears in a SIP
Message -->
    <!-- SIPAttribute corresponds to a parameter that appears in a SIP
Message -->
    <!-- Default type is unspecified -->
    <registration>
      <Security-Client type="SIPHeader">Digest
        <alg type="SIPAttribute">md5</alg>
      </Security-Client>
      <Authorization type="SIPHeader">Digest
        <username type="SIPAttribute">user_private</username>
        <password type="SIPAttribute">password</password>
        <integrity-protected
type="SIPAttribute">yes</integrity-protected>
      </Authorization>
```

In one embodiment, where the handset is preconfigured with the user agent profile prior to delivery to the customer, the user agent profile is stored in the restricted memory. Such a user agent profile remains "locked" until the predetermined subscriber agreement between the subsidizing service provider and the customer has expired. At such time, the service provider may elect to unlock the user agent profile by entering a password. Where this is the case, the user is then able to edit or otherwise change the user agent profile to function with other service providers.

To illustrate by way of example, where cellular service provider Opular and non-IMS VoIP service provider Xthype combine to subsidize a handset capable of communicating across both IMS and non-IMS channels, Opular wants to ensure that all IMS communication is channeled through its network. This is achieved by traditional subsidy locks, including SIM-based subsidy locks. Similarly, Xthype desires to ensure that all non-IMS communication is channeled through its service, and not through that of another non-IMS service provider. The present invention provides a method and apparatus for doing this. In one embodiment, this assurance occurs only for the predetermined subscription period. At the end of this predetermined period, Xthype is free to enter a password on the user's handset to unlock the user agent profile. Should the customer at this time desire to use another service provider, for example hypothetical service provider Spekich, the user may alter the user agent profile such that non-IMS communication uses Spekich's service.

As an alternative to preconfiguration, noted above, the user agent profile may be delivered from a remote source to the handset. Such may be the case where a user desires to select from a plurality of service providers. In such a scenario, the user agent profile may be delivered from one of a variety of means, including SIP messaging or hypertext transfer protocol (HTTP). Where employing an IETF profile retrieval method to accomplish this user agent profile delivery, the access control property may be selected to "hidden" so as to prevent editing or alteration of the user agent profile prior to the expiration of the predetermined usage period. Upon expiration, the service provider may change the hidden status by delivering a password to the handset.

Turning now to FIG. 1, illustrated therein is one embodiment of a data protocol voice enabled communication device 100 in accordance with embodiments of the invention. In one embodiment, the device 100 is configured to communicate with at least a non-IMS network, such as through a VoIP channel across a wide area network 103. The device 100 may also be configured to communicate across other networks, e.g. 104, such as a cellular network, including GSM, CDMA, W-CDMA, CDMA-2000, iDEN, TDMA, and other networks. For simplicity of discussion, the exemplary device 100 described herein will be one configured to communicate with both the wide area network 103 through a non-IMS channel 105, and a mobile network, which may include an IMS channel (such as a traditional celluar channel) 106, such as the terrestrial, base-station cellular network 104 depicted in FIG. 1. It will be clear to those of ordinary skill in the art having the benefit of this disclosure that the invention is not so limited, however. Other connection schemes within the device 100 may also be employed. For instance, the device 100 may be configured to communicate by land-line and by non-IMS VoIP, or by satellite and non-IMS VoIP, and so forth.

The device 100 may include standard components such a user interface 107 and associated modules, which may include a display 108, a keypad 109, voice control modules, or touch sensitive interfaces. Additionally, the device 100 includes wireless communication circuitry having at least one of a receiver 110 or a transmitter 111 and an antenna 112. Where the device 100 supports two-way communication, both the transmitter 111 and receiver 110, or a combined transceiver (implementing the receiver and transmitter together), will be used to transmit packets of data between the various networks 102,104 and the device 100. The receiver 110, transmitter 111 or transceiver will generally employ some form of the antenna 112 to wirelessly communicate with a network node 113 or base station transceiver 114 associated with a particular communication network. Where the network is a base station network 104, such as a cellular telephone network, the antenna 112 will communicate directly with one of the base stations 114 to establish communication through the IMS channel 106. When the network is a wide area network 103, the antenna 112 will communicate through a network node 113, such as a wireless router coupled to a network connection.

The device 100 includes a controller 115, which may be a microprocessor, a group of processing components, one or more Application Specific Integrated Circuits (ASICs), programmable logic or other processing device. The controller 115 processes and executes software code to perform the various functions of the device 100. A storage device 116, such as a memory, stores the executable codes used by the controller 115 for device operation. The storage device 116 also stores the user agent profile 118 and usage restriction module 119.

In one embodiment, the storage device 116 is partitioned into a restricted portion 117 and non-restricted portion. Where the user agent profile 118 is invisible to the user, such that the user agent profile 118 may not be edited or changed, the user agent profile 118 resides in the restricted portion 117.

Similarly, the usage restriction module 119, described in more detail below, is stored in the restricted portion 117.

When the device 100 is communicating with through the non-IMS channel 105, the device 100 transmits VoIP messages across the wide area network 103 to the intended recipient 120. The messages are facilitated by the subsidizing VoIP service provider 121. While there may be many service providers capable of providing the VoIP service, the subsidizing service provider 121 wants to ensure that only its service is used for the non-IMS channel (which may include communication over the Internet) 105. This is accomplished by and with the service provider's identification 123. Generally, non-IMS providers route packet-switched data through a server 122 or other hardware. This server 122 is located and accessed by an identifier 123, which may be an IP address, domain name, or other network identifier. The device 100, with its usage restriction module, employs the identifier 123 to ensure that the service provider's system will be used.

Figure 2:
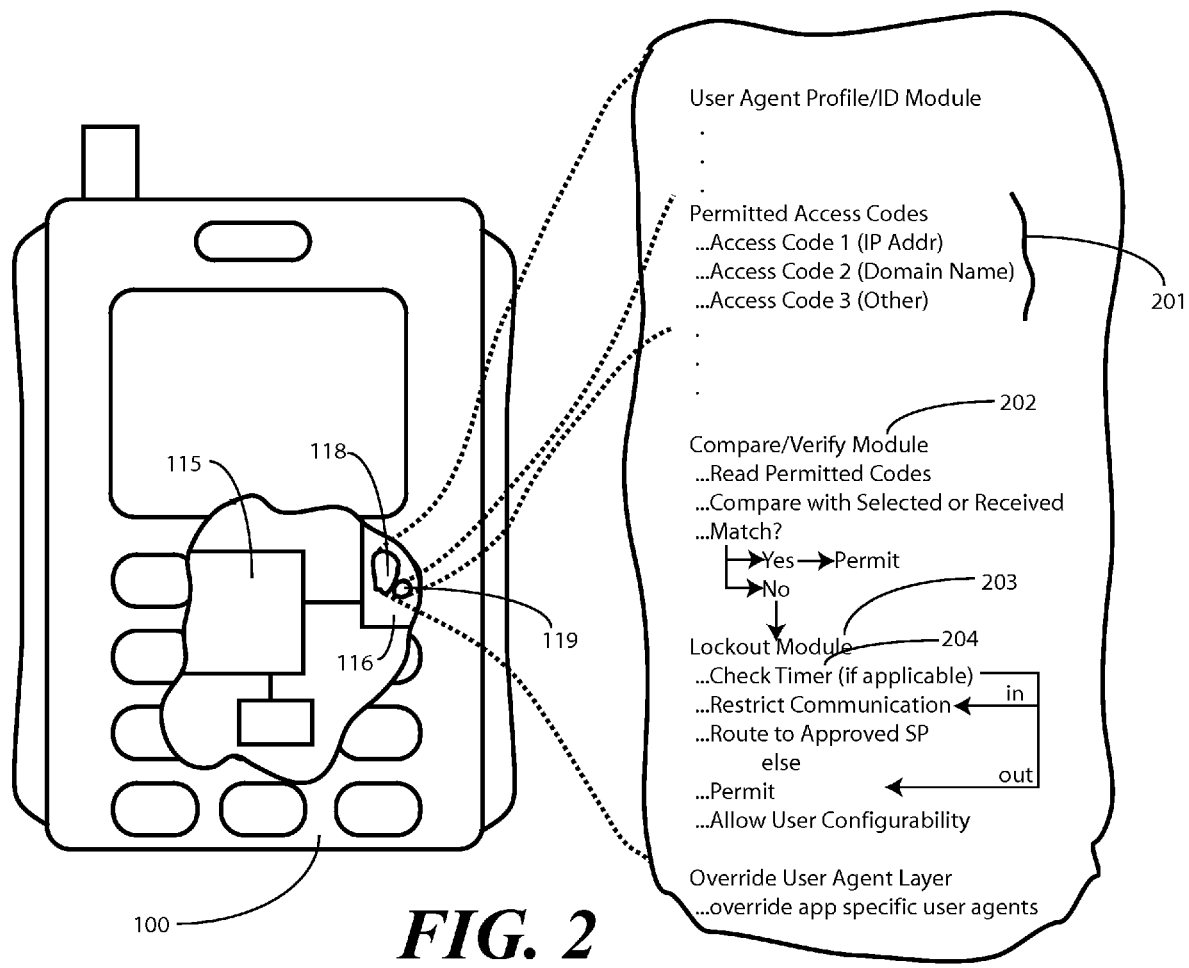
FIG. 2 illustrates a mobile communication device, and associated operating code, configured to provide a non-IMS subsidy lock in accordance with embodiments of the invention.

Turning now to FIG. 2, illustrated therein are the device 100 and modules in more detail. The storage device 116 is used for storing the user agent profile 118 and a usage restriction module 119. The user agent profile 118 and usage restriction module 119 may comprise executable software commands configured to be operable with the controller 115.

In one embodiment, the user agent profile 118 includes a set of one or more permitted data access identification codes 201. The one or more permitted data access identification codes 201 identify at least a service provider with which usage of a data protocol voice enabled wireless communication service is permitted. Turning again to the hypothetical example above, if the non-IMS service provider Xthype subsidizes the purchase price of the device 100, yet service provider Spekich does not, the user agent profile 118 would include a permitted data access identification code for Xthype and not Spekich. Where multiple service providers are permitted, for instance where multiple service providers subsidize hardware, the user agent profile 118 would include multiple permitted data access identification codes.

It will be clear to one of ordinary skill in the art having the benefit of this disclosure that a particular device is not limited to only one subsidy lock. By way of example, a device having both IMS and non-IMS capabilities may have both an IMS subsidizer and a non-IMS subsidizer. In such a scenario, when the mobile tries to access the conventional cellular or IMS network, it may employ a conventional subsidy locking mechanism. When the device attempts to access a service provider for non-IMS service, it may then use a user agent profile in accordance with embodiments of the present invention.

The usage restriction module 119 employs these permitted data access identification codes 201 to ensure that non-IMS communication occurs only through permitted non-IMS channels. A comparator 202, which may be implemented as software code, compares selected voice enabled data communication service provider information received from an incoming service provider message to the one or more permitted data access identification codes 201 to determine whether a particular service provider is an approved service provider. For example, when a user initiates a non-IMS communication, the device 100 attempts to connect with a service provider server (122) across the wide area network (103) by transmitting a data message to the service provider (121). In response to this initial message, the service provider (121) will transmit a response message. This response message will include the service provider's identifier (123). The comparator uses this identifier (123) to determine whether the service provider contacted is a permitted service provider.

Where the service provider is a permitted service provider, the voice enabled data communication service provider information received from the incoming service provider message will correspond to one of the permitted data access identification codes 201. Such would be the case where the identifier identifies a non-IMS VoIP service provider with which the user has a subscription for access to voice enabled data communication services. In such a scenario, communication is permitted.

Where the service provider is not a permitted service provider, a lockout module 203 is capable of at least partially restricting the voice enabled data communication capabilities of the device 100. This occurs when the comparator 202 detects that the voice enabled data communication service provider information fails to correspond with at least one of the one or more permitted data access identification codes 201. Such a scenario may arise when a user attempts to use a non-IMS service provider other than the subsidizing provider. The return message from that provider would include an identifier that fails to correspond with one of the permitted data access identification codes 201. The lockout module 203 may then restrict at least partial usage of the device by prohibiting communication with the non-permitted service provider.

As noted above, limiting usage of only subsidizing providers may only be desirable for a predetermined time. A user may sign a limited service agreement for a limited time, perhaps one or two years. As such, in one embodiment a timer 204, which may be implemented as software code, is included. Where the lockout module 203 is operable for at least a predetermined time corresponding to a predetermined service provider agreement term, the lockout module 203 may be configured to check the timer 204 prior to restricting usage of the device 100. Where the timer 204 has not expired, the lockout module 203 remains effective.

Where the permitted data access identification codes 201 are not accessible to the user, the codes will remain inaccessible for the predetermined time. Where the timer 204 is expired, which corresponds to expiration of the service agreement, one of several options may occur: the lockout module 203 may continue to be functional; the service provider may "unlock" the user agent profile 118, thereby allowing the user access to the permitted data access identification codes 201; or the device may automatically allow access to portions or all of the restricted portion 117 such that the one or more permitted data access identification codes 201 are user configurable.

Figure 3:
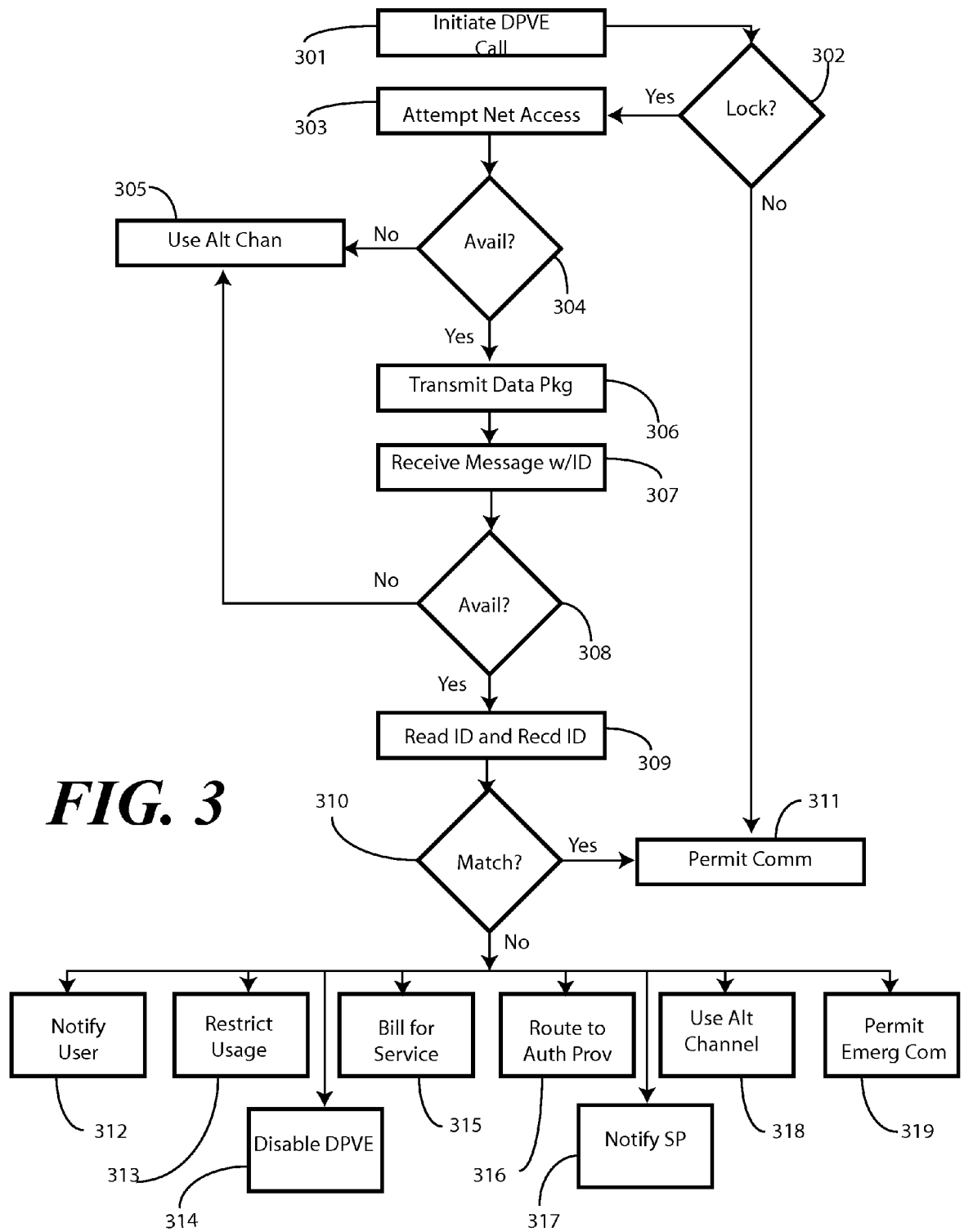
FIG. 3 illustrates one method for providing a non-IMS subsidy lock in accordance with embodiments of the invention.

Turning now to FIG. 3, illustrated therein is one embodiment of a method of limiting data network access in a data protocol voice enabled communication device (100). The method, in one embodiment, limits data protocol voice enabled communication, such as non-IMS VoIP, while not hindering any other type of communication. Where the device (100) has a user agent profile (118) with a service provider profile having permitted data network access codes stored therein, the method ensures that the device (100) communicates only with approved service providers for at least a predetermined time.

At step 301, a user initiates a data protocol voice enabled call. This step is generally accomplished by selecting a desired recipient from a list of contacts, or by entering a telephone number. Where the device is a dual mode device, for example one configured to make both cellular (with or without IMS communication) calls and non-IMS communication calls, the device may allow the user to select which mode to use. Alternatively, the device may detect the presence of a local area network connection to a wide area network, and may then automatically select the mode. The device may also determine which mode is most efficient or desirable based upon user inputs.

At decision 302, the device determines whether a subsidy lock for the selected mode is in place. Presuming that the call to be made is a non-IMS voice call, the device—or the control unit by way of executable code stored within the memory—would determine whether the device were locked. In one embodiment, this step is accomplished by checking a timer to see whether a subsidy lock is in effect. Where the lock is not in effect, the call is permitted at step 311.

Where the lock is in place, the device attempts to access a data communication channel, such as a local area connection to a wide area network like the Internet, by a data transmission at step 303. Where the user agent profile is not accessible by the user, the data transmission will be directed to one of the preconfigured voice over data network providers. Thus, the data transmission will include at least one of the permitted voice over data network service provider codes that are stored within the memory. Where the user agent profile is accessible to the user, the data transmission will include an identifier of a desired voice over data network providers. The identifier may be any of domain names, Internet protocol address, or combinations thereof. Additional identifiers will be obvious to those of ordinary skill in the art having the benefit of this disclosure.

At decision 304, the device optionally determines whether the selected network is available. This may be accomplished in a variety of ways, including detecting data transfer, transmitting a message and receiving a response, or otherwise querying the desired network connection. Where the network is unavailable, an alternate communication channel or network is employed at step 305.

Where the network connection is available, the device transmits at least one data message to a data service provider node, such as a remote source server, at step 306. As noted above, the data service provider node includes a node identifier that corresponds to the service provider's identity. In response to the transmission of this data message, the service provider's node transmits a response data message, which is received at step 307. The response data message will include the service provider's identifier information. The response message, which like the transmitted message could be a HTTP communication, an extensible mark-up language access configuration protocol message, or a SIP message, also indicates that the service provider node is available, as is determined at decision 308. In one embodiment, the method permits data protocol voice enabled communication only when the data service provider node is available. Where it is not, an alternate network or communication channel is used at step 305.

Where the service provider's node is available, at step 309, the device reads both the service provider's identifier from the received message and the permitted data service provider identification codes from the user agent profile. In one embodiment, the method permits data protocol voice enabled communication only with data communication channels having service provider identifiers corresponding to at least one of the one or more permitted data service provider identification codes stored in memory. At least partial usage of the device is restricted where a service provider having an identifier matching the codes is unavailable. As such, the device determines whether there is a match at decision 310. Where there is a match, which is indicative that a voice over network service provider with which usage of the device is permitted is available, the device permits communication at step 311

Where there is not a match, a variety of optional actions may occur. In one embodiment for example, indicated at step 319, voice over network communication is restricted to only emergency usage. A user may be able to make emergency calls, such as "911" calls over the voice over network channel, but not other calls.

The user may be notified that that there has been a mismatch at step 312. An icon or menu item may be presented on the screen that indicates that the selected service provider is not approved at this time. Such an indicator would allow the user to redirect the call through an approved service provider.

At step 313, partial usage of the device may be restricted. Where, for instance, the device is configured to communicate across both cellular (with or without IMS) and non-IMS channels, the user may be restricted to only cellular channels. Similarly, at step 314, all data protocol voice enabled communication, such as non-IMS VoIP, may be disabled.

As an optional feature that provides additional convenience, the call across the non-subsidizing carrier's channel may be billed at step 315. Since the user has elected a non-permitted channel, in one embodiment the user may still make the call, but may be charged for the call in this scenario. The non-permitted channel call effectively becomes a toll call.

At step 316, the call may be routed to an authorized service provider. Where, for example, the user agent profile includes more than one permitted data access codes, upon detecting a mismatch at decision 310, the device may be configured to automatically reroute the call through one of the authorized providers. In such a scenario, the device may again carry out steps 301-310 to establish a connection with the authorized service provider.

At step 317, the device may optionally notify the service provider that a call through a non-subsidized carrier is being attempted. Where certain carriers have agreements with other carriers, such calls may be permitted upon approval by the carrier.

At step 318, alternate networks or channels may be used. For instance, where the desired call is a non-IMS call, and there is a mismatch at decision 310, the device may be configured to automatically attempt a call through the other mode, which may be an IMS channel. Such a redirection may be either seamless or invisible to the user, or may be announced on a display.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of limiting data network access in a data protocol voice enabled communication device having a service provider profile with one or more permitted data service provider identification codes stored therein, the method comprising the steps of:

reading the one or more permitted data service provider identification codes; and permitting data protocol voice enabled communication only with data communication channels having service provider identifiers corresponding to at least one of the one or more permitted data service provider identification codes;

wherein the data protocol voice enabled communication comprises voice over Internet protocol communication.

2. The method of claim 1, wherein the at least one of the one or more permitted data service provider identification codes is selected from the group consisting of domain names, Internet protocol addresses, and combinations thereof.

3. The method of claim 2, wherein the method further comprises the steps of:

transmitting at least one data message to a data service provider node having a node identifier corresponding to the at least one of the one or more permitted data service provider identification codes;

receiving at least one response data message; and determining an availability of the data service provider node from the at least one response data message;

wherein the step of permitting data communication comprises permitting data communication only where the data service provider node is available.

4. The method of claim 3, wherein the at least one data message comprises a session initiation protocol message.

5. The method of claim 3, wherein the step of transmitting the at least one data message occurs across a wide area network.

6. The method of claim 5, wherein the wide area network is the Internet.

7. The method of claim 1, further comprising the step of electronically receiving at least one of the one or more permitted data service provider identification codes from a remote source.

8. The method of claim 7, wherein the step of receiving comprises receiving the at least one of the one or more permitted data service provider identification codes by one of session initiation protocol communication, extensible markup language access configuration protocol message, or hypertext markup language communication.

9. A usage restriction module comprising:

a storage device for storing one or more permitted data access identification codes, where the one or more permitted data access identification codes identify at least a service provider with which usage of a data protocol voice enabled wireless communication service is permitted;

a comparator for comparing voice enabled data communication service provider information received from an incoming service provider message to the one or more permitted data access identification codes; and a lockout module capable of restricting voice enabled data communication capabilities of a data protocol voice enabled wireless communication device where the comparator detects that the voice enabled data communication service provider information fails to correspond with at least one of the one or more permitted data access identification codes;

wherein the data protocol voice enabled communication comprises voice over Internet protocol communication.

10. The usage restriction module of claim 9, wherein the lockout module is operable for at least a predetermined time corresponding to a predetermined service provider agreement term.

11. The usage restriction module of claim 10, wherein the one or more permitted access identification codes are inaccessible to a user for at least the predetermined time.

12. The usage restriction module of claim 11, wherein upon expiration of the predetermined time, the storage device is configured such that the one or more permitted access identification codes are user configurable.

13. The usage restriction module of claim 9, wherein the one or more permitted access identification codes comprise one of domain names, Internet protocol addresses, or combinations thereof.

14. The usage restriction module of claim 9, wherein the voice enabled data communication service provider information received from the incoming service provider message comprises information identifying at least a voice over Internet protocol service provider with which a user has a subscription for access to voice enabled data communication services.

15. The usage restriction module of claim 9, wherein the usage restriction module is disposed within and operable with a wireless communication device having voice over Internet protocol communication capabilities, further wherein the usage restriction module is configured to override application specific user agents disposed within the data protocol voice enabled wireless communication device.

16. A method of restricting usage of a data protocol voice enabled communication device, where the data protocol voice enabled communication device comprises a service provider profile having one or more permitted voice over data network service provider identification codes stored therein, the method comprising:

attempting to access a data communication channel by a data transmission including at least one of the one or more permitted voice over data network service provider identification codes; and restricting at least partial usage of the data protocol voice enabled communication device where a voice over data network communication channel having a service provider identifier matching the one or more permitted access identification codes is unavailable;

wherein the data transmission including the at least one of the one or more permitted access codes comprises a session initiation protocol message.

17. The method of claim 16, wherein restricting the at least partial usage comprises restricting voice over data network communication usage other than emergency usage of the data protocol voice enabled communication device.

18. The method of claim 16, wherein the one or more permitted voice over data network service provider identification codes identify one or more networks associated with voice over data network service providers with which usage of the data protocol voice enabled communication device is permitted.

* * * * *